United States Patent
Arora et al.

(10) Patent No.: US 9,762,632 B2
(45) Date of Patent: Sep. 12, 2017

(54) SYSTEMS AND METHODS FOR ESTABLISHING AND CONTROLLING CONFERENCE CALL BRIDGES

(71) Applicant: VONAGE BUSINESS INC., Atlanta, GA (US)

(72) Inventors: Nehar Arora, Old Bridge, NJ (US); Tzahi Efrati, Hoboken, NJ (US)

(73) Assignee: VONAGE BUSINESS INC., Atlanta, GA (US)

( * ) Notice: Subject to any disclaimer, the term of this patent is extended or adjusted under 35 U.S.C. 154(b) by 27 days.

(21) Appl. No.: 14/854,920

(22) Filed: Sep. 15, 2015

(65) Prior Publication Data
US 2017/0078338 A1  Mar. 16, 2017

(51) Int. Cl.
*H04L 29/06* (2006.01)
*H04M 3/56* (2006.01)

(52) U.S. Cl.
CPC ........ *H04L 65/403* (2013.01); *H04L 65/1069* (2013.01); *H04M 3/56* (2013.01)

(58) Field of Classification Search
None
See application file for complete search history.

(56) References Cited

U.S. PATENT DOCUMENTS

| 7,412,047 | B2* | 8/2008 | Nguyen | H04M 3/56 379/202.01 |
| 8,824,341 | B2* | 9/2014 | Logan | G06Q 10/109 370/260 |
| 9,392,121 | B2* | 7/2016 | Sall | H04M 3/563 |
| 2008/0189366 | A1* | 8/2008 | Cox | H04L 12/581 709/204 |
| 2015/0103991 | A1* | 4/2015 | Albert | H04M 3/56 379/202.01 |
| 2016/0014169 | A1* | 1/2016 | de Castro | H04L 65/403 370/261 |
| 2016/0234264 | A1* | 8/2016 | Coffman | H04L 65/1069 |
| 2016/0360038 | A1* | 12/2016 | Phelps | H04M 3/5175 |

* cited by examiner

*Primary Examiner* — Min Jung
(74) *Attorney, Agent, or Firm* — Nixon & Vanderhye P.C.; Joseph Pagnotta (57) ABSTRACT

Systems and methods allow an administrator of a conference call bridge to control who is admitted to the conference call bridge. The systems and methods also allow the administrator to identify a new individual who will become the administrator of the conference call bridge when a triggering event occurs. The systems and methods also allow an administrator to identify a new endpoint device from which valid control commands can be received.

27 Claims, 8 Drawing Sheets

SYSTEMS AND METHODS FOR ESTABLISHING AND CONTROLLING CONFERENCE CALL BRIDGES

BACKGROUND OF THE INVENTION

The invention is related to conference calling, and more specifically, to systems and methods for establishing and controlling conference call bridges.

The way in which a traditional conference calling bridge can be controlled is somewhat limited. For example, in a traditional conference calling bridge one individual or one telephony device is typically established as the administrator or controller of the conference call. The individual can issue control commands and possibly alter settings for the conference call bridge. However, it is not possible to designate a new individual or telephony device as the administrator. As a result, if the administrator or controller of a conference call must leave the conference call, or becomes disconnected due to a connectivity problem, the conference call may be prematurely terminated against the will of the other conference call participants. Even when the conference call can continue after the administrator has become disconnected, it is impossible for a new individual to act as the administrator and issue control commands.

In addition, in a traditional conference calling arrangement the administrator provides participants with a telephone number to call, and an access code that the participant must enter to gain access to the conference call bridge. Unfortunately, it is possible for one participant to share this information with another individual who the administrator never intended to have present on the conference call bridge. Thus, an administrator typically has only a limited degree of control over who is allowed to join a conference call bridge.

It would be desirable to provide conference call bridges which enable an administrator to exert a greater degree of control. In particular, it would be desirable to provide an administrator with a greater degree of control over who joins a conference call bridge. It would also be desirable to provide the administrator with the ability to designate another individual or another telephony device that is authorized to issue control commands.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The systems and methods disclosed and claimed herein relate to conference calling bridges, and control systems and methods for controlling conference call bridges. The conference call bridges and control systems could be implemented by a telephony system provider operating over a publically switched telephone network (PSTN), by a cellular telephony system provider operating via a cellular telephony system and/or a PSTN, or by an Internet protocol (IP) telephony system. However, implementing the disclosed conference call bridge technology via an IP telephony system may provide greater functionality than would be possible with a more traditional PSTN or cellular telephony network. For this reason, we first provide a basic description of elements of an IP telephony system, and how it interacts with various different types of telephony devices before turning to a detailed description of the conference call bridge technology.

Although many of the following descriptions of the disclosed conference call bridge control technology refer to use of an IP telephony system, it is to be understood that the disclosed and claimed systems and methods could be implemented by other types of telephony systems. Thus, any references to an IP telephony system should in no way be considered limiting.

In the following description, the terms VOIP system, VOIP telephony system, IP system and IP telephony system are all intended to refer to a system that connects callers and that delivers data, text or video communications using Internet protocol data communications.

Figure 1:
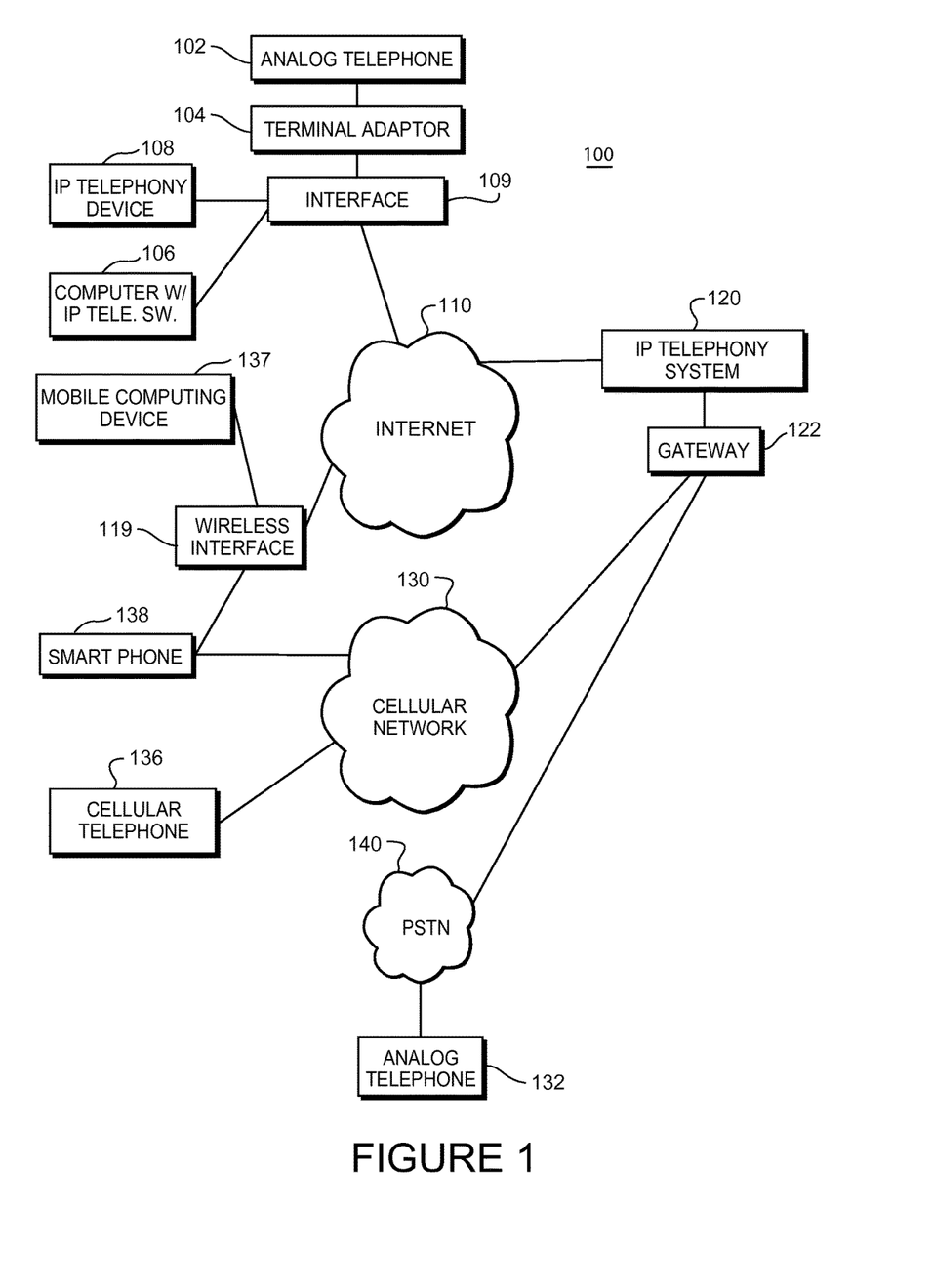
FIG. 1 is a diagram of a communications environment including various elements which are associated with an Internet protocol (IP) telephony system operating in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 140 and a cellular telephony network 130 via one or more gateways 122.

The gateway 122 allows users and devices that are connected to the PSTN 140 and cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephony device 108 that is connected to the Internet 110 via an interface 109. Such an IP telephony device 108 could be connected to an Internet service provider via a wired connection or via a wireless router.

Alternatively, a customer could utilize a normal analog telephone 102 which is connected to the Internet 110 via a terminal adapter 104 and the interface 109. The terminal adapter 104 converts analog signals from the telephone 102 into digital data signals that pass over the Internet 110, and vice versa. Analog telephony devices include, but are not limited to, standard telephones and document imaging devices such as facsimile machines.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a terminal adaptor 104 that is connected to one or more analog telephones 102.

Likewise, a mobile computing device 137 may be used to send and receive telephony communications via the IP telephony system 120. The mobile computing device 137 could establish a data connection to the Internet 110 via a wireless interface 119, such as a WiFi router. IP telephony software on the mobile computing device 137 could then be used to conduct telephony communications through the IP telephony system 120.

A third party using an analog telephone 132 which is connected to the PSTN 140 may call a customer of the IP telephony system 120. In this instance, the call is initially connected from the analog telephone 132 to the PSTN 140, and then from the PSTN 140, through the gateway 122 to the IP telephony system 120. The IP telephony system 120 then routes the call to the customer's IP telephony device. Likewise, a third party using a cellular telephone 136 could also place a call to an IP telephony system customer, and the connection would be established in a similar manner, although the first link would involve communications between the cellular telephone 136 and a cellular telephony network 130.

In addition, a smartphone 138 that includes both mobile computing capabilities and cellular telephony capabilities can connect to the cellular network 130 using its cellular telephone capabilities. However, the smartphone 138 also may establish a data connection to the IP telephony system 120 via a wireless interface 119 and the Internet 110. In this instance, communications between the smartphone 138 and other parties could be entirely carried by data communications. Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephony device 108 located in a country outside the U.S. to access the services. Likewise, the customer could also utilize a computer with IP telephony software 106 or a mobile computing device with IP telephony software 137 outside the U.S. to access the IP telephony system 120. Further, in some instances a user could place a telephone call with the analog telephone 132 or the cellular telephone 136 that is routed through the PSTN 140 or cellular network 130, respectively, to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 140 or cellular network 130.

Figure 2:
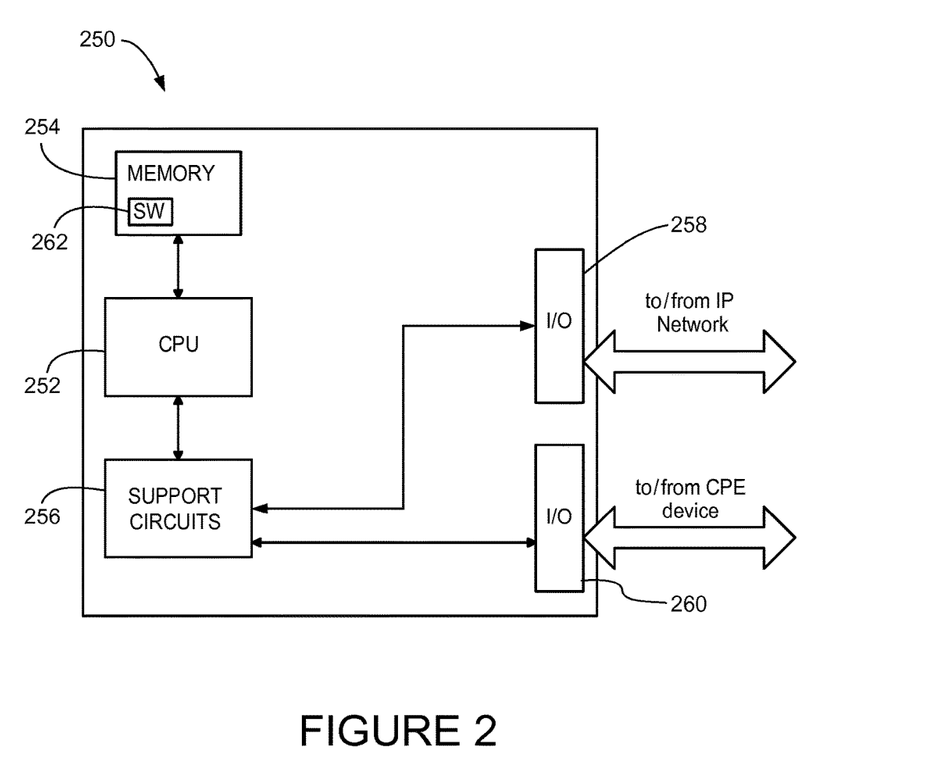
FIG. 2 is a diagram of various elements of a processor that forms part of an IP telephony system and/or part of a conference call bridge control unit and/or user's telephony device.

FIG. 2 illustrates elements of a computer processor 250 that can be used as part of the IP telephony system 120, as part of a conference call bridge control unit, or as part of a user's telephony device, to accomplish various functions. An IP telephony system 120, a conference call bride control unit and a telephony device could all include multiple processors 250, along with their respective operating components and programming, each carrying out a specific or dedicated portion of the functions performed by the IP telephony system 120, by the conference call bridge control unit, or by the telephony device.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, a conference call bridge control unit and/or a user's telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to a "telephony device." This term is used to refer to any type of device which is capable of interacting with a telephony system to conduct or participate in a telephony communication. This includes traditional analog telephones, cellular telephones, IP telephones configured to conduct telephony communications via IP data communications, as well as other computing devices which can be configured to conduct telephony communications via data communications, such as a computer running IP telephony software. Because various different computing devices can be configured to conduct telephony communications via a data network, a single device might be capable of operating as both a computing device and as a telephony device.

Certain devices that are not traditionally used as telephony devices may act as telephony devices once they are configured with appropriate client software. One example would be a desktop or a laptop computer that is running software that can interact with an IP telephony system over a data network to conduct telephone calls. Another example would be a portable computing device, such as an Apple iPod touch™ or an Apple iPad™, which includes a speaker and a microphone. A software application loaded onto an Apple iPad™ can be run so that the Apple iPad™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
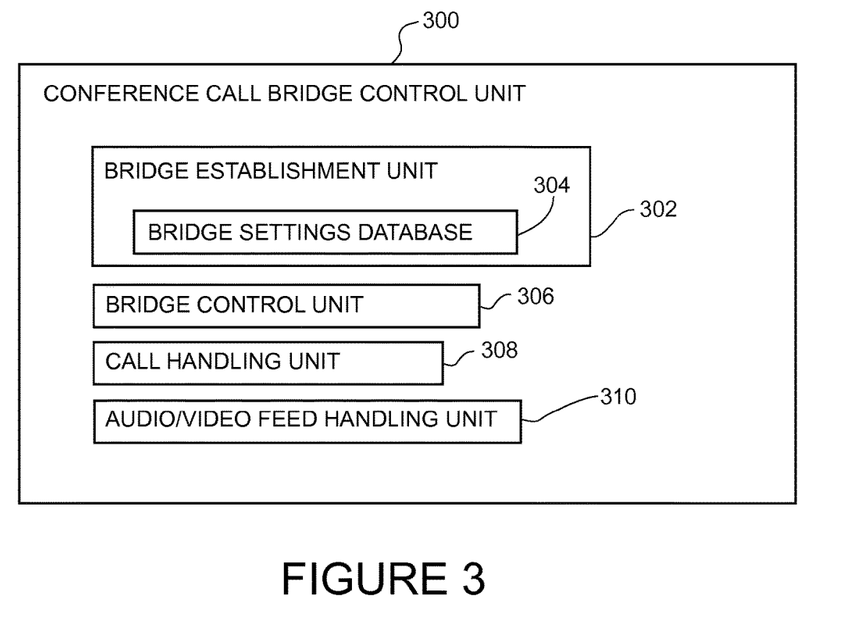
FIG. 3 is a block diagram illustrating elements of a conference call bridge control unit.

FIG. 3 illustrates elements of a conference call bridge control unit 300 which can be used to setup and control conference call bridges. As mentioned above, the conference call bridge control unit 300 could be part of an IP telephony system 120 as illustrated in FIG. 1. Alternatively, the conference call bridge control unit 300 could be part of a different type of telephony system, or it could be a stand-alone unit that is not connected to any particular telephony system.

The conference call bridge control unit 300 includes a bridge establishment unit 302, which itself includes a bridge settings database 304. An individual wishing to set up a new conference call bridge would interact with the bridge establishment 302. That interaction would typically include providing details about the conference call bridge, such as a date and time that the conference call will start, and a list of participants who are to be added to the conference call bridge.

In some embodiments, the conference call bridge can be tied to the same telephone number that is assigned to a telephony system user's regular telephony device. In other instances, the conference call bridge may be tied to a specific number assigned to the conference call bridge, or to a central telephone number that is used to access many different conference call bridges.

For example, a user could specify that any time certain people dial his regular telephone number, those people are to be automatically added to a conference call bridge. The user could also setup multiple different conference call bridges, all of which are tied to his regular telephone number. The user would provide a separate list of people for each of the conference call bridges, each list including those individuals who are to be automatically added to the respective conference calling bridge when they dial the user's regular telephone number.

When the conference call bridges are set up in this fashion, any time that a caller places a telephone call to the user's regular telephone number, an element of the conference call bridge control unit 300 receives that incoming call setup request. The element of the conference call bridge control unit 300 that receives the telephone call would typically be provided with some information about the calling party, in the form of caller ID information. This could include both the telephone number of the calling party, and/or the calling party's name.

The element of the conference call bridge control unit that receives the incoming telephone call then compares the information it received identifying the calling party to the lists of people that the user has specified are to be automatically added to his conference calling bridges. If the calling party is identified as a participant for one of the conference call bridges that the user has established, then the calling party would be automatically connected to that conference call bridge.

One example of such a scenario would be if a user sets up a conference call bridge that is dedicated to his own family members. The user would provide the bridge establishment unit 302 with identifying information for each of the user's family members. This could include the family members' telephone numbers and/or their names. This information would be stored in the bridge settings database 304. Once the user has setup the conference call bridge for his family members, any time that a family member calls the user's regular telephone number, the caller is immediately connected to the conference call bridge setup for the user's family members.

In some embodiments, it will not be necessary for the user to actually be on the conference call bridge for the conference call bridge to be active and in use by other individuals. For example, in the embodiment described above, where a user sets up a conference call bridge for his family members, it would be possible for two or more family members to call the user's regular telephone number and to be added to the conference call bridge setup for the user's family members while the user himself never participates in the conference call.

In some embodiments, when a caller dials the user's regular telephone number, the caller may be asked to interact with an interactive voice response system to determine if the caller wishes to be added to a conference call bridge, or if the caller wishes to directly speak with the user himself. Based on the caller's responses, the call would then either be directed to a conference call bridge or the call could be connected directly to a user's telephony device or to a voicemail system.

The conference call bridge control unit 300 illustrated in FIG. 3 also includes a bridge control unit 306. The bridge control unit 306 is used to perform control functions on an ongoing conference call bridge. Those control functions could include adding additional participants to the conference call bridge, muting the audio feed from one or more participant's telephony device, removing a participant from a conference call bridge, as well as other control functions. For example, an administrator of a conference call bridge may initiate a private one-on-one call with a participant while the conference call is ongoing, and no other participants would be able to hear the audio of that one-on-one call. An administrator may be able to transfer control over the conference call bridge from one endpoint (such as a telephony device or a computer-implemented user interface) to a second endpoint. As will be described in more detail below, the control functions also could include transferring control over the conference call bridge to a different party. The administrator may be able to turn on and turn off a transcription service that generates a transcription of the spoken audio that is hear over the conference call bridge. Of course, many other control functions may also be possible.

The conference call bridge control unit 300 also includes a call handling unit 308. The call handling unit 308 receives incoming telephone calls from calling parties, and then direct those calls to the most appropriate location. For example, and as described above, if an incoming call is from a calling party that is on a list provided by the user for a specific conference call bridge, the incoming call could be automatically connected to that conference call bridge. If an incoming call is from a calling party that is not listed for any of the conference call bridges which have been established by the user, the call could be routed to a default endpoint such as the user's telephony device, or perhaps to a voicemail system.

The conference call bridge control unit 300 also includes an audio/video feed handling unit 310. The audio/video feed handling unit 310 provides the conference call bridge control unit 300 with the ability to control how audio feeds are distributed to conference call participants, and to the user himself. As will be described in more detail below, this could allow the user who has setup a conference call bridge to monitor the ongoing audio of a conference call bridge, while simultaneously talking to a new caller. If the user decides to add the new caller to the conference call bridge, the user could issue an appropriate control command which would be acted on by the bridge control unit 306 to add the new caller to an existing conference call bridge. At that point in time, both the user and the new caller would become active participants in the conference call bridge.

Figure 4:
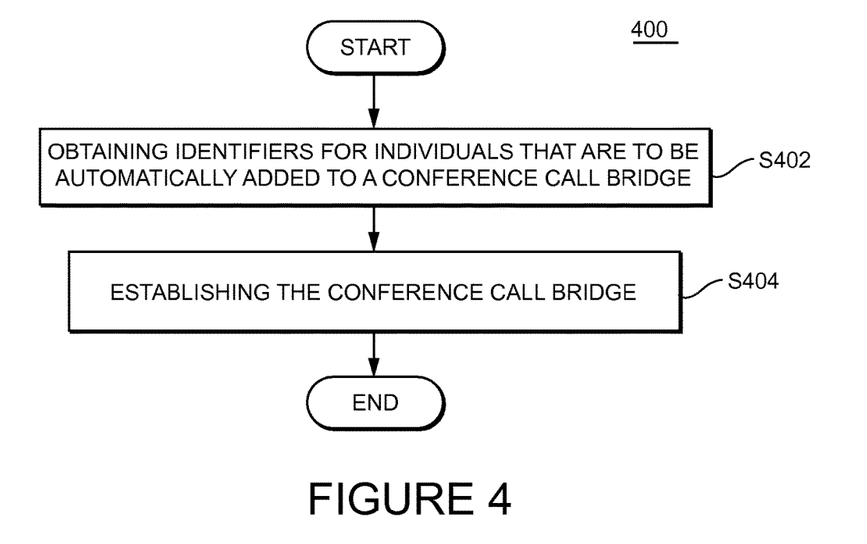
FIG. 4 is a flow diagram illustrating steps of a method for configuring a conference call bridge.

FIG. 4 illustrates the steps of a method used to setup a conference calling bridge like the ones discussed above, where a caller is automatically added to the conference call bridge if a user includes the caller in a list of individuals or telephone numbers associated with the conference call bridge. The method 400 begins and proceeds to step S402 where the bridge establishment unit 302 of a conference call bridge control unit 300 obtains identifiers for individuals that are to be automatically added to the conference call bridge. The identifiers could be telephone numbers, the names of people who are to be added as participants, identifiers associated with the telephony devices used by individuals, or other identifiers. The method then proceeds to step S404 where the bridge establishment unit 302 establishes the conference call bridge. This could include recording settings for the conference call bridge in the bridge settings database 304 of the bridge establishment unit 302.

A conference call bridge which is established by the method illustrated in FIG. 4 could be tied to a dedicated telephone number for the conference call bridge, or it could be tied to the user's regular telephone number. When a calling party who wishes to be a participant on a conference call bridge dials a telephone number associated with the conference call bridge, it may be necessary for the caller to provide additional information before the caller is added to the conference call bridge. In other embodiments, however, the caller is automatically added to the conference call bridge because the caller has been listed as a participant on the conference call bridge by the user who setup the conference call bridge.

Figure 5:
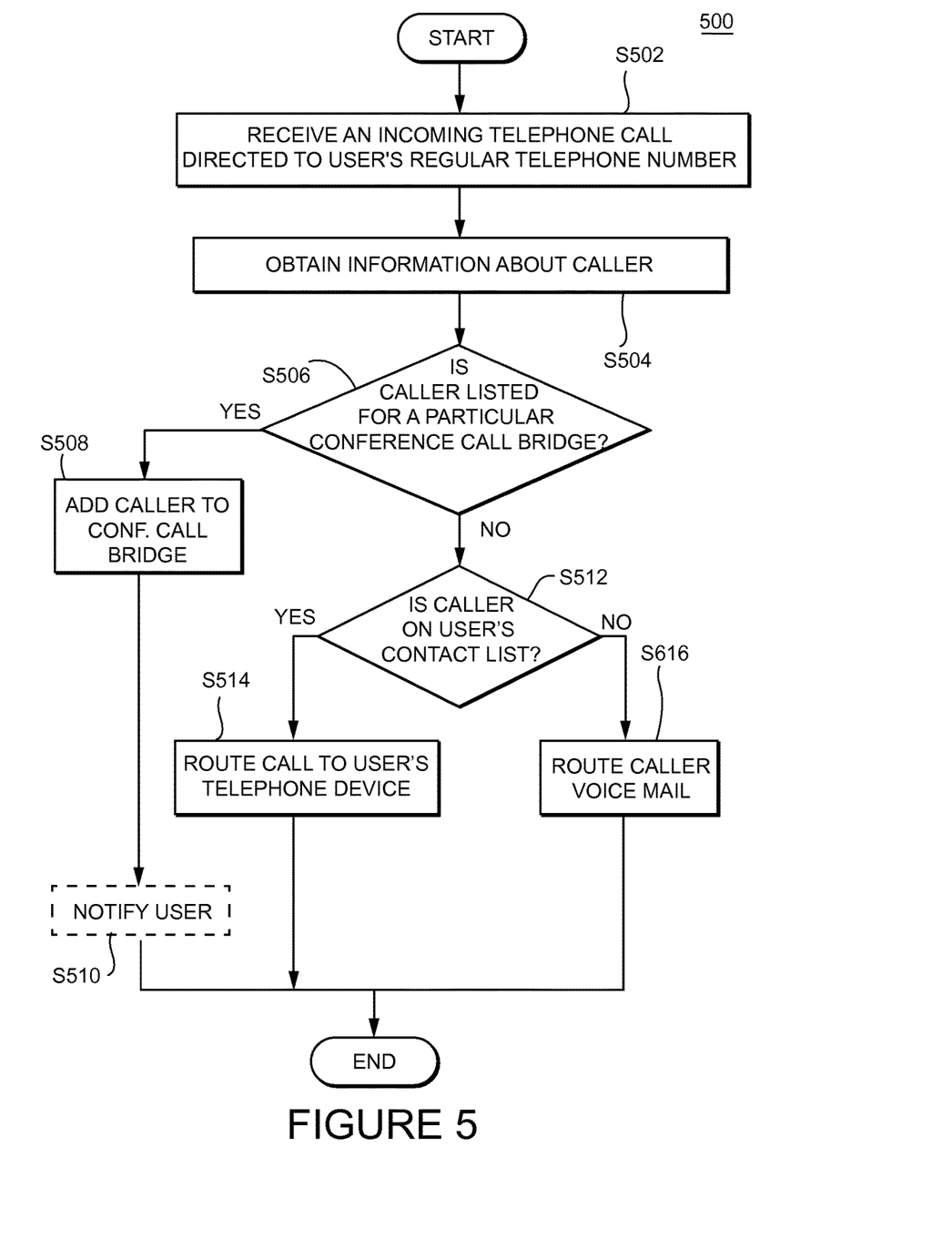
FIG. 5 is a flow diagram illustrating steps of a method for routing an incoming caller that is attempting to reach a user, or a conference call bridge that has been setup by the user.

FIG. 5 illustrates steps of a method that would be performed by elements of a conference call bridge control unit 300 to direct a calling party to the appropriate location. The method 500 begins and proceeds to step S502 where a call handling unit 308 receives an incoming telephone call which has been placed to a telephone number associated with a conference call bridge. As noted above, that telephone number could be the regular telephone of the user who setup the conference call bridge, or some other telephone number which has been assigned to the conference call bridge. Note: the user who set up the conference call bridge may be able to join the conference call bridge by calling his own telephone number.

The method then proceeds to step S504 where the call handling unit 308 obtains information about the caller. This could include receiving signaling information or other information conveyed with the call setup, including, for example, caller ID information which provides an indication of the telephone number and/or name of the calling party. Such information could be passed in, for example, SIP headers. Other types of obtained information may include information about the endpoint or telephony device that a calling party is using to access the conference call bridge, such as whether the device is a computer running telephony software, a dedicated telephony device, or some other type of device, an IP address of the telephony device, a type or model of the device, and perhaps information about the local time of the calling party. In other embodiments, the calling party could interact with an interactive voice response system to provide identifying information. The identifying information could be a telephone number, the caller's name, or a code or identification number which is associated with the calling party, a code or identification number that is associated with the calling party's telephony device, and/or an identification code or number associated with the conference call bridge. The information provided need not be limited to just identifying information, but could be any information that may be manually input or otherwise communicated by the caller.

The method then proceeds to step S506 where the call handling unit 308 uses the obtained identifying information to determine whether the calling party is listed as a participant for a conference call bridge. In this example, we will assume that the calling party called the regular telephone number of a user that setup at least one conference call bridge via a method similar to the one illustrated in FIG. 4. Thus, step S506 would involve using the obtained identifying information to determine if the calling party is listed as a participant for any of the conference call bridges that have been setup by the user.

If the calling party is listed as a participant on one of the user's conference call bridges, the method proceeds to step S508 and the caller is connected to that conference call bridge. In some embodiments, the method may include an optional step S510 where the user who setup the conference call bridge is notified that the calling party has just been connected to the conference call bridge.

If the check performed in step S506 indicates that the calling party is not listed as a participant for any of the user's conference call bridges, the call handling unit 308 the method proceeds to step S512, where a check is performed to determine whether the caller is listed on a contact list or address book which is maintained for the user, or which is present on one of user's telephony devices.

If the calling party is listed as one of the user's contacts, in step S514 the call handling unit 308 directs the call to the user's telephony device. If the calling party is not listed as one of the user's contacts, in step S516 the call is instead routed to the user's voicemail box. In alternate embodiments, and depending on whether the calling party is listed as one of the user's contacts, the call could be routed to a predetermined alternate telephone number, such as a receptionist for a business. In some embodiments, if the calling party is not listed as one of the user's contacts, but the calling party was a participant on a previous conference call with some or all of the same participants, the calling party may be automatically added to the conference call bridge. Alternatively, under those circumstances, the user could be queried to determine if the calling party should be added, and the appropriate action is taken based on the user's response to the query. Once the call has been directed to a certain endpoint, the method ends.

Figure 6:
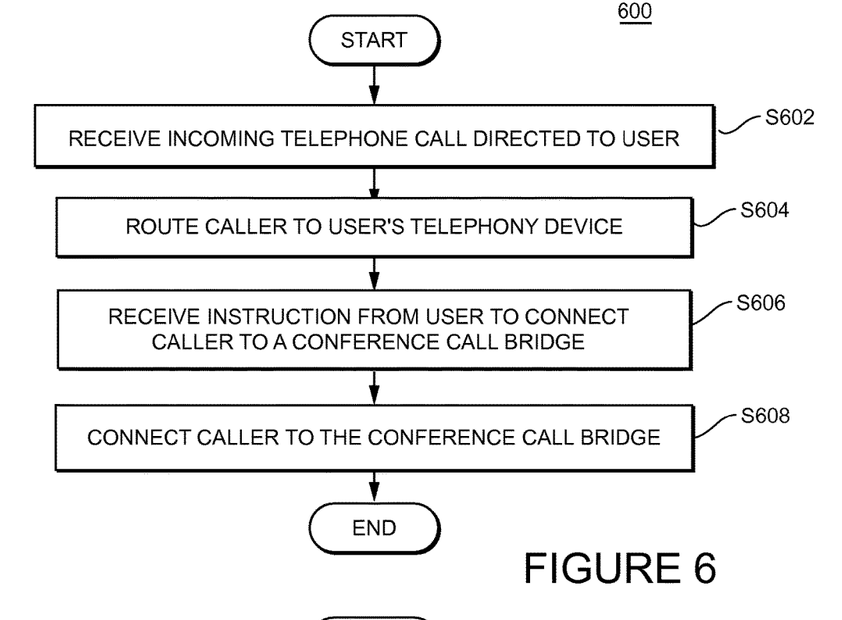
FIG. 6 is a flow diagram illustrating steps of another method for routing an incoming caller that is attempting to reach a user, or a conference call bridge that has been setup by the user.

FIG. 6 illustrates steps of a method which could be performed by a conference call bridge control unit 300 to route a calling party to a user, and then ultimately to add the caller to a conference call bridge. The method 600 begins and proceeds to step S602 where the call handling unit 308 of a conference call bridge control unit 300 receives an incoming call from a calling party. In step S604, the caller is routed to the user's telephony device. This could occur because the caller is not listed as a participant on any of the user's conference call bridges, and because the caller is listed as a contact for the user, as was discussed above in connection with the method illustrated in FIG. 5.

The user and the caller could interact over the connected telephone call. However, in some embodiments, the user could continue to monitor the activity of an ongoing conference call bridge while speaking to the calling party. For example, the audio that is being generated on the conference call bridge could be played over the speaker of the user's telephony device at the same time that the user is speaking with the calling party. The calling party will not be able to hear the activity on the conference call bridge. Instead the calling party would believe that they are simply conducting a normal telephone call with the user. If audio from an existing conference call bridge is being played to the user at the same time he is conducting a telephone call with a new calling party, the audio from the conference call bridge could be played at a lower volume level than the audio associated with the telephone call that has been setup to the calling party. This would allow the user to better focus on his communication with the calling party, but would still provide the user with the ability to monitor the ongoing activity on the conference call bridge.

If the user wishes to add the calling party to an ongoing conference call bridge, the user issues an instruction to that effect to the bridge control unit 306. This could be accomplished by pressing keys on a keypad of the user's telephony device. Alternatively, the user may issue such a command via a software application running on a separate computing device, or via some other fashion. In step S606, the call handling unit 308 of the conference call bridge control unit 300 would receive that instruction from the user to connect the calling party to the conference call bridge. The method would then proceed to step S608 where the call handling unit 308 connects the calling party to the conference call bridge. The method then ends.

Figure 7:
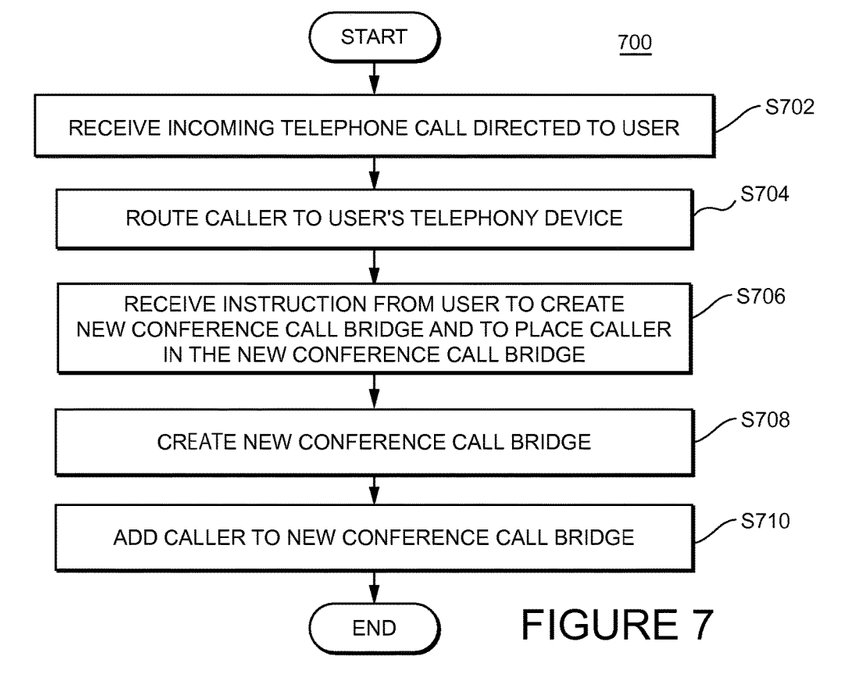
FIG. 7 is a flow diagram illustrating steps of another method for routing an incoming caller that is attempting to reach a user, or a conference call bridge that has been setup by the user.

FIG. 7 illustrates steps of a method which could be performed by conference call bridge control unit 300 to create a new conference call bridge and to add a caller to that new conference call bridge. A method as illustrated in FIG. 7 allows the user to create a new conference call bridge on the fly when a calling party attempts to contact the user. The user could then direct subsequent calling parties to that same conference call bridge after it has been established. In addition, the user could go back to the bridge establishment unit 302 and provide identifying information for additional people who are to become participants in the newly created conference call bridge.

The method 700 begins and proceeds to step S702 where a call handling unit 308 receives an incoming call directed to a user's regular telephone number, which is associated with one or more conference call bridges. In step S704 the caller is routed to the user's telephony device. This could occur via a method as illustrated in FIG. 5, where the caller is routed to the user's telephony device because the calling party is not listed as a participant of any of the user's conference call bridges, and because the calling party is listed as one of the user's contacts.

At that point, the calling party and user could converse with one another via the telephone call which has been established between the calling party and the user's telephony device. If the user wishes to create a new conference call bridge which will be used by the calling party, the user would issue such an instruction, and the instruction would be received by one or more elements of the conference call bridge control unit 300 in step S706. The instruction could be issued in many ways, such as entering a predetermined code through a keypad of the user's telephony device; issuing a spoken command; or otherwise interacting with a graphical user interface. Next, in step S708, the bridge establishment unit 302 creates a new conference call bridge. The new conference bridge may be assigned an identifier to facilitate its use and reference by the user in the future. In step S710, the caller is connected to the new conference call bridge.

As mentioned above, a bridge control unit 306 of a conference call bridge control unit 300 could allow a user who has established a conference call bridge to perform various control functions. One of those functions could be to change the individual or telephony device which is able to exert control over a conference call bridge. For example, when a user sets up a new conference call bridge, the user would be listed as the administrator of the conference call bridge. The administrator is the individual who is able to issue control commands to accomplish certain functions, such as adding new participants, muting the audio feed from selected participants, deleting an existing participant from a conference call bridge, and other similar control functions. The user typically issues those control commands from a telephony device. The telephony device could be the user's regular telephony device associated with a particular telephone number that is also associated with the conference call bridge. Alternatively, it may be possible for the administrator to issue control commands from other telephony devices, or possibly from a software application running on a computing device.

Figure 8:
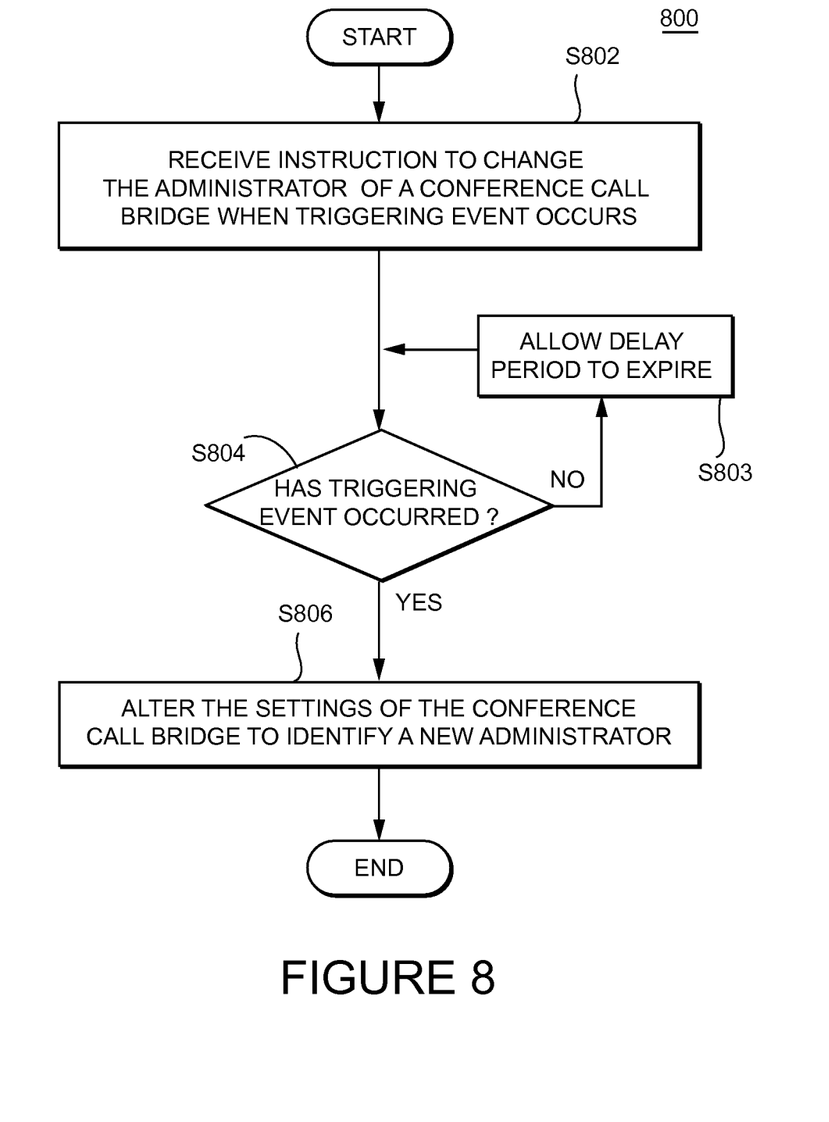
FIG. 8 is a flow diagram illustrating steps of a method for altering the identity of an administrator of a conference call bridge.

The method illustrated in FIG. 8 begins and proceeds to step S802 where the bridge control unit 306 of a conference call bridge control unit 300 receives an instruction from the current administrator of a conference call bridge to change the individual who is to act as the administrator of the conference call bridge upon the occurrence of a certain triggering event. In some instances, the instruction received in step S802 could identify the name of the individual who is to become the new administrator. In other embodiments, the instruction received in step S802 could include an identifier associated with a telephony device or a computing device that is used by the individual who is to become the administrator, such as a telephone number.

The method then proceeds to step S804 where a check is performed to determine if the triggering event has occurred. The triggering event could merely be the receipt of the instruction to change the administrator which occurs in step S802. Alternatively, the instruction received in step S802 may indicate that the administrator for the conference call bridge is to change to a new individual at a certain specified date and time. The instruction could further specify that the administrator is to revert back to the original administrator at a different date and time. Under these scenarios, the check performed in step S802 would be to determine if the triggering date and time have arrived.

If the check performed in step S804 indicates that the triggering event has not yet occurred, the method proceeds to step S803 where a delay period is allowed to expire. The method then loops back to step S804 to perform another check to determine whether the triggering event has occurred.

When the check performed in step S804 indicates that the triggering event has occurred, the method proceeds to step S806, where the settings of the conference call bridge are altered to identify the new individual as the administrator of the conference call bridge who is authorized to perform control functions for the conference call bridge. The method then ends.

In a method as illustrated in FIG. 8, the triggering event also could be the current administrator becoming disconnected from the conference call bridge. For example, the current administrator of the conference call bridge could specify that if the current administrator becomes disconnected from the conference call bridge, then a specific individual should be named as the new administrator of a conference call bridge. This would allow the current administrator to deliberately leave the conference call, or this could cover a scenario where the current administrator becomes inadvertently disconnected from the conference call bridge. A further triggering event could be the rejoining of the call by the prior administrator, whereby he would again become the administrator. Prioritization between individuals as the default administrator may be maintained as a predetermined and configurable list.

Moreover, such an instruction might not name a specific individual who is to become the new administrator of the conference call bridge, but rather identify an individual based on objective data. For example, the instruction could indicate that if the current administrator becomes disconnected from the conference call, the first individual to join the conference call is to become the new administrator.

Figure 9:
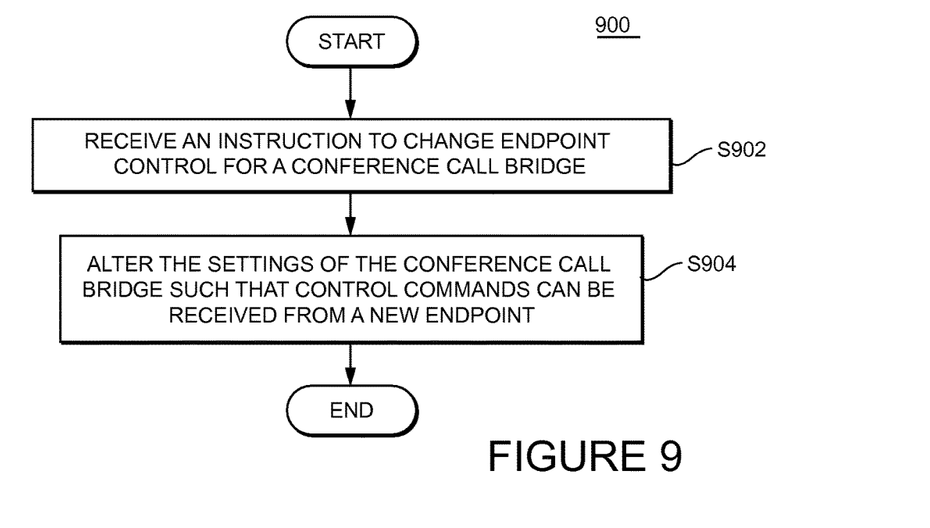
FIG. 9 is a flow diagram illustrating steps of a method for altering the endpoint telephony device that is able to control a conference call bridge.

FIG. 9 illustrates steps of a method which would be performed by elements of a conference call bridge control unit 300 to change the endpoint device which is able to control a conference call bridge. For example, a method as illustrated in FIG. 9 could be used by an administrator of the conference call bridge to identify a new telephony device that the administrator would like to use to control the conference call bridge. The original and new endpoint devices which are used to control the conference call bridge could be a telephony device, or a computing device running a software application.

The method 900 begins and proceeds to step S902 where the bridge control unit 306 of a conference call bridge control unit 300 receives an instruction to change the endpoint device which is able to control a conference call bridge. The method then proceeds to step S904 where the settings of the conference call bridge are altered such that control commands can be received from the newly identified endpoint device. In some embodiments, the setting changed in step S904 would mean that control commands received from the original endpoint device would be ignored, and only commands issued from the new endpoint device would be considered valid. In alternate embodiments, the settings changed in step S904 would result in commands issued from both the original endpoint device and the newly identified endpoint device being considered valid.

Figure 10:
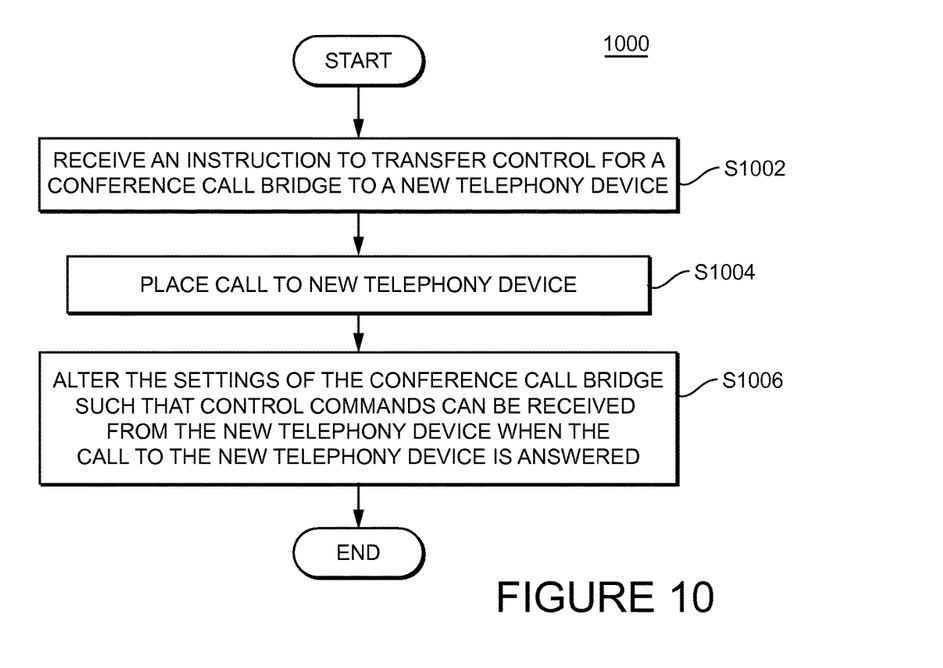
FIG. 10 is a flow diagram illustrating steps of another method for altering the endpoint telephony device that is able to control a conference call bridge.

FIG. 10 illustrates steps of another method for altering the endpoint device which is able to control a conference call bridge. The method 1000 begins and proceeds to step S1002 where a bridge control unit 306 receives an instruction to transfer control for a conference call bridge to a new telephony device. The new telephony device is to be the endpoint which is able to issue command instructions for the conference call bridge. The command received in step S1002 includes identifying information that identifies the new telephony device, such as a telephone number assigned to the telephony device, an IP address associated with an IP telephony device, or some other form of identifying information.

The method then proceeds to step S1004 where the call handling unit 308 of the conference call bridge control unit 300 places an outgoing telephone call to the new telephony device that was identified in step S1002. The user would answer that call at the new telephony device. When the user answers the call at the new telephony device, in step S1006 the settings of the conference call bridge are altered such that control commands can now be received from the newly identified telephony device. The method then ends.

In some embodiments, the settings which are altered in step S1006 would result in the bridge control unit ignoring control commands issued from the previously endpoint device that was in control of the conference call bridge. In other embodiments, the settings altered in step S1006 would allow an administrator to issue control commands from both the original endpoint device, and the newly identified telephony device.

Figure 11:
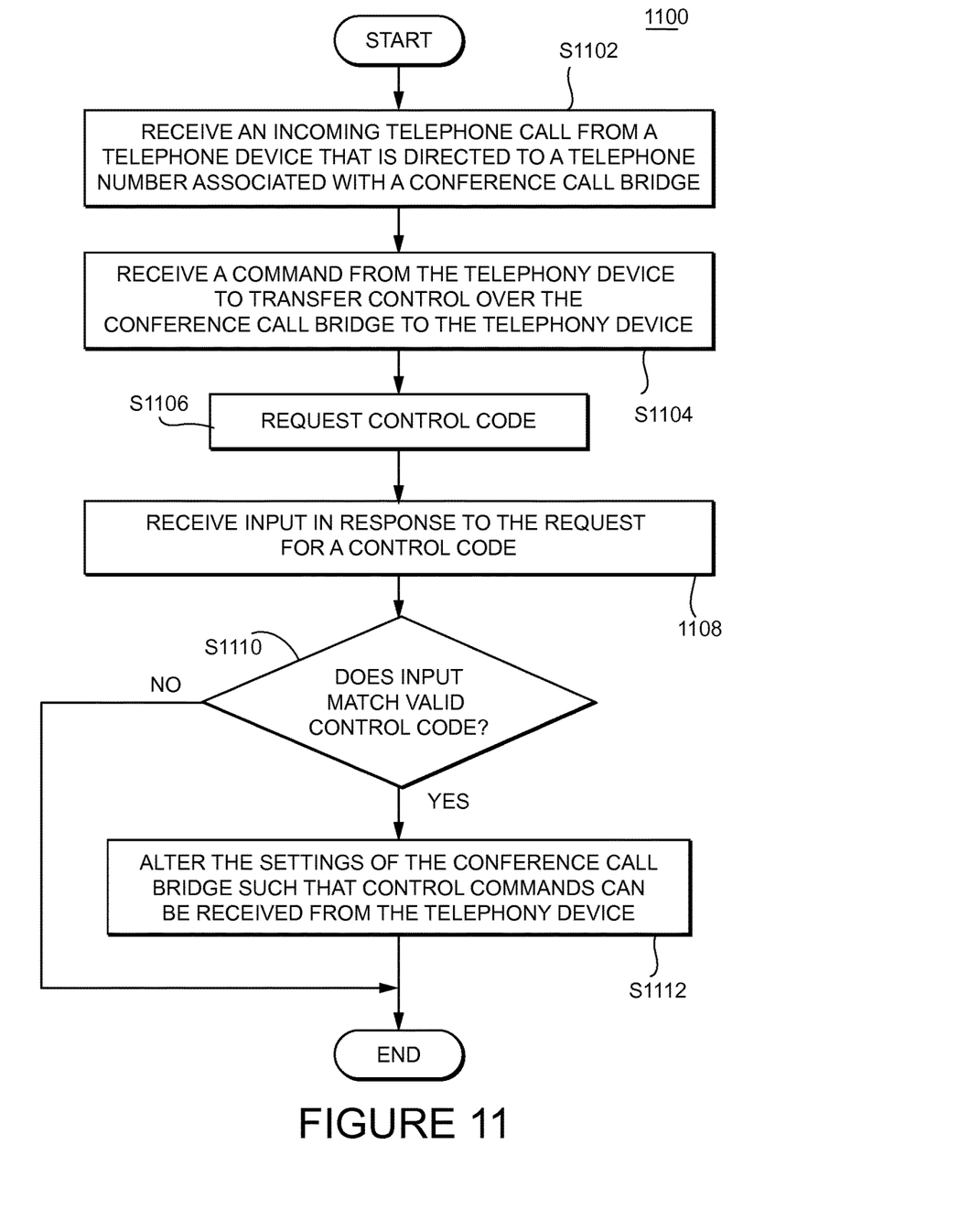
FIG. 11 is a flow diagram illustrating steps of another method for altering the endpoint telephony device that is able to control a conference call bridge.

FIG. 11 illustrates steps of another method which could be used to change the endpoint device which can issue commands to control a conference call bridge. The method 1100 begins and proceeds to step S1102 where the call handling unit 308 of a conference call bridge control unit 300 receives an incoming telephone call which is directed to a telephone number associated with a particular conference call bridge. Once that incoming call has been answered, the user would issue a control command from the calling telephony device which requests that calling telephony device be the endpoint device in control of the conference call bridge. In step S1104 the bridge control unit 306 would receive that control command. The bridge control unit 306 then requests the user to input a control code. In step S1108 the bridge control unit 306 receives input provided by the user from the calling telephony device.

In step S1110 a check is performed to determine if the control code provided by the user matches a valid control code. If not, the method would end. If the control code does match a valid control code, the method proceeds to step S1112 where the settings of the conference call bridge are altered such that control commands can now be received from the telephony device which placed the call to the conference call bridge.

In some embodiments, once control has been transferred to the new endpoint device, any commands issued from the previous endpoint device are ignored. In other embodiments, the user may be able to continue to use both the previous endpoint device and the new endpoint device issue control instructions for the conference call bridge.

Some of the foregoing descriptions discussed the invention in terms of an audio conference call. In alternate embodiments of the invention, the claimed systems and methods could be used to automatically connect an individual to a video conference. In such alternate embodiments, instead of placing an outgoing telephone call to a conference call bridge, the system could establish a communications channel to a video conference calling system. Thus, any references in the foregoing description and the following claims to an access telephone number are to be interpreted as also encompassing an access Internet IP address and/or an access Internet URL. Likewise, any references to a conference call are to be interpreted as encompassing both audio and video conference calls. Any references to establishing a communications channel are to be interpreted as encompassing establishing an audio communications channel via one or more telephony systems, as well as establishing a video communications channel via telephony and/or computer or data networks.

Although some of the foregoing descriptions referred to an IP telephony system, the same basic methods could also be accomplished by an alternate type of telephony system, such as a traditional analog telephony system or a cellular telephony system. Thus, the use of an IP telephony system for purposes of describing the technology should in no way be considered limiting.

In many of the foregoing descriptions, a software application running on a telephony device may perform certain functions related to the disclosed technology. In alternate embodiments, a browser running on the telephony device may access a software application that is running on some other device via a data network connection. For example, the software application could be running on a remote server that is accessible via a data network connection. The software application running elsewhere, and accessible via a browser on the telephony device may provide all of the same functionality as an application running on the telephony device itself. Thus, any references in the foregoing description and the following claims to an application running on a telephony device are intended to also encompass embodiments and implementations where a browser running on a telephony device accesses a software application running elsewhere via a data network.

Also, although many of the examples discussed above relate to telephony communications, those telephony communications could be audio or video calls, video conferences, or other forms of communications. The methods and techniques described above could be used to enable many different types of communications. Thus, the foregoing references to calls or telephony communications should in no way be considered limiting.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a conference call system for connecting participants to a conference call bridge, comprising:
    obtaining identifiers for individuals that are to be automatically connected to the conference call bridge when the individuals place a telephone call to a telephone number corresponding to the conference call bridge, wherein the telephone number corresponding to the conference call bridge is the same telephone number that one would dial to place a telephone call directly to an administrator of the conference call bridge;
    receiving a telephone call that has been placed to the telephone number corresponding to the conference call bridge by a new caller after at least one individual already has been connected to the conference call bridge;
    connecting the new caller to a telephony device used by the administrator of the conference call bridge, the new caller being connected in a whisper mode such that the new caller and the administrator can talk to one another, such that the administrator can also hear the audio of the conference call bridge while speaking to the new caller in the whisper mode, and such that the at least one individual who already has been connected to the conference call bridge cannot hear anything spoken by the administrator or the new caller while the administrator and new caller are connected to one another in the whisper mode;
    and
    connecting the new caller to the conference call bridge upon receiving an instruction from the administrator to connect the new caller to the conference call bridge.

2. The method of claim 1, wherein connecting the new caller to the conference call bridge comprises:
    receiving an instruction from the administrator to connect the new caller to the conference call bridge;
    cancelling the whisper mode connection between the new caller and the telephony device used by the administrator; and
    connecting the new caller to the conference call bridge.

3. The method of claim 1, wherein the conference call bridge is a first conference call bridge, the method further comprising:
receiving an instruction from the administrator to connect the new caller to a second conference call bridge;
cancelling the whisper mode connection between the new caller and the telephony device used by the administrator; and
connecting the new caller to the second conference call bridge.

4. The method of claim 1, further comprising sending a notification to an administrator of the conference call bridge each time a caller is connected to the conference call bridge.

5. The method of claim 1, further comprising determining whether the new caller is one of the individuals that is to be automatically connected to the conference call bridge based on caller ID information that is obtained when the telephone call from the new caller is received.

6. The method of claim 1, further comprising determining whether the new caller is one of the individuals that is to be automatically connected to the conference call bridge by:
obtaining information from the new caller that is indicative of the identity of the new caller; and
determining whether the new caller is one of the individuals that is to be automatically connected to the conference call bridge based on the obtained information and the obtained identifiers for individuals that are to be automatically connected to the conference call bridge.

7. The method of claim 6, wherein obtaining information from the new caller comprises interacting with the new caller via an interactive voice response application to obtain the information indicative of the new caller's identity.

8. The method of claim 1, wherein the obtaining step comprises obtaining at least one of telephone numbers and/or names of individuals that are to be automatically connected to the conference call bridge.

9. The method of claim 1, wherein when a first individual that is to be automatically connected to the conference call bridge calls the telephone number corresponding to the conference call bridge, the conference call bridge is opened and the first individual is automatically connected to the conference call bridge regardless of whether an administrator of the conference call bridge is present on the conference call bridge.

10. The method of claim 9, wherein when subsequent individuals that are to be automatically connected to the conference call bridge call the telephone number corresponding to the conference call bridge, the subsequent individuals are automatically connected to the conference call bridge without requiring the subsequent individuals to provide any information relating to the conference call bridge.

11. The method of claim 1, wherein the step of connecting the new caller to a telephony device used by the administrator of the conference call bridge
is performed when the new caller is not one of the individuals that is to be automatically connected to the conference call bridge, and when the new caller is present on a contact list maintained by the administrator.

12. The method of claim 11, further comprising connecting the new caller to a voice mailbox when the new caller is not one of the individuals that is to be automatically connected to the conference call bridge, and when the new caller is not present on the contact list maintained by the administrator.

13. The method of claim 1, wherein:
the obtaining step comprises obtaining a first list of identifiers for individuals that are to be automatically connected to a first conference call bridge and obtaining a second list of identifiers for individuals that are to be automatically connected to a second conference call bridge when those individuals place a telephone call to a single telephone number that corresponds to both the first and second conference call bridges, the method further comprising;
connecting an individual that has called the single telephone number to the first conference call bridge without requiring the individual to provide any information relating to the first conference call bridge when the individual is one of the individuals that is to be automatically connected to the first conference call bridge; and
connecting an individual that has called the single telephone number to the second conference call bridge without requiring the individual to provide any information relating to the second conference call bridge when the individual is one of the individuals that is to be automatically connected to the second conference call bridge; and
connecting an individual that has called the single telephone number to at least one of the telephony device used by the administrator of the first and second conference call bridges and/or a voice mailbox when the individual is not one of the individuals that is to be automatically connected to either the first conference call bridge or the second conference call bridge.

14. A system for controlling a conference call bridge, comprising:
means for obtaining identifiers for individuals that are to be automatically connected to the conference call bridge when the individuals place a telephone call to a telephone number corresponding to the conference call bridge, wherein the telephone number corresponding to the conference call bridge is the same telephone number that one would dial to place a telephone call directly to an administrator of the conference call bridge;
means for receiving a telephone call that has been placed to the telephone number corresponding to the conference call bridge by a new caller after at least one individual already has been connected to the conference call bridge;
means for connecting the new caller to a telephony device used by the administrator of the conference call bridge, the new caller being connected in a whisper mode such that the new caller and the administrator can talk to one another, such that the administrator can also hear the audio of the conference call bridge while speaking to the new caller in the whisper mode, and such that the at least one individual who already has been connected to the conference call bridge cannot hear anything spoken by the administrator or the new caller while the administrator and new caller are connected to one another in the whisper mode; and
means for connecting the new caller to the conference call bridge upon receiving an instruction from the administrator to connect the new caller to the conference call bridge.

15. A system for controlling a conference call bridge, comprising:
a bridge establishment unit that obtains identifiers for individuals that are to be automatically connected to a conference call bridge when the individuals place a telephone call to a telephone number corresponding to the conference call bridge, wherein the telephone number corresponding to the conference call bridge is the same telephone number that one would dial to place a telephone call directly to an administrator of the conference call bridge; and a call handling unit that:
receives a telephone call that has been placed to the telephone number corresponding to the conference call bridge by a new caller after at least one individual already has been connected to the conference call bridge;
connects the new caller to a telephony device used by the administrator of the conference call bridge, the new caller being connected in a whisper mode such that the new caller and the administrator can talk to one another, such that the administrator can also hear the audio of the conference call bridge while speaking to the new caller in the whisper mode, and such that the at least one individual who already has been connected to the conference call bridge cannot hear anything spoken by the administrator or the new caller while the administrator and new caller are connected to one another in the whisper mode; and
connects the new upon receiving an instruction from the administrator to connect the new caller to the conference call bridge.

16. The system of claim 15, wherein when the call handling unit receives an instruction from the administrator to connect the new caller to the conference call bridge, the call handling unit cancels the whisper mode connection between the new caller and the telephony device used by the administrator and connects the new caller to the conference call bridge.

17. The system of claim 15, wherein the conference call bridge is a first conference call bridge, and wherein when the call handling unit receives an instruction from the administrator to connect the new caller to a second conference call bridge, the call handling unit cancels the whisper mode connection between the new caller and the telephony device used by the administrator and connects the new caller to the second conference call bridge.

18. The system of claim 15, wherein the call handling unit sends a notification to the administrator of the conference call bridge each time a caller is added to the conference call bridge.

19. The system of claim 15, wherein the call handling unit determines whether the new caller is one of the individuals that is to be automatically connected to the conference call bridge based on caller ID information that is obtained when the telephone call from the new caller is received.

20. The system of claim 15, wherein the call handling unit obtains information from the new caller that is indicative of the identity of the new caller, and determines whether the new caller is one of the individuals that is to be automatically connected to the conference call bridge based on the obtained information and the obtained identifiers for individuals that are to be automatically connected to the conference call bridge.

21. The system of claim 20, wherein the call handling unit interacts with the new caller via an interactive voice response application to obtain the information indicative of the new caller's identity.

22. The system of claim 15, wherein the bridge establishment unit obtains at least one of telephone numbers and/or names of individuals that are to be automatically connected to the conference call bridge.

23. The system of claim 15, wherein when a first individual that is to be automatically connected to the conference call bridge calls the telephone number corresponding to the conference call bridge, the call handling unit acts to cause the conference call bridge to be opened and automatically connects the first individual to the conference call bridge regardless of whether an administrator of the conference call bridge is present on the conference call bridge.

24. The system of claim 23, wherein when subsequent individuals that are to be automatically connected to the conference call bridge call the telephone number corresponding to the conference call bridge, the call handling unit automatically connects those subsequent individuals to the conference call bridge without requiring the subsequent individuals to provide any information relating to the conference call bridge.

25. The system of claim 15, wherein the call handling unit connects
the new caller to a telephony device used by an administrator of the conference call bridge when the new caller is not one of the individuals that is to be automatically added to the conference call bridge, and when the new caller is present on a contact list maintained by the administrator.

26. The system of claim 25, wherein the call handling unit connects the new caller to a voice mailbox when the new caller is not one of the individuals that is to be automatically added to the conference call bridge, and when the first caller is not present on the contact list maintained by the administrator.

27. The system of claim 15, wherein:
the bridge establishment unit obtains a first list of identifiers for individuals that are to be automatically connected to a first conference call bridge and obtains a second list of identifiers for individuals that are to be automatically connected to a second conference call bridge when those individuals place a telephone call to a single telephone number that corresponds to both the first and second conference call bridges, and wherein the call handling unit:
connects an individual that has called the single telephone number to the first conference call bridge without requiring the individual to provide any information relating to the first conference call bridge when the individual is one of the individuals that is to be automatically connected to the first conference call bridge;
connects an individual that has called the single telephone number to the second conference call bridge without requiring the individual to provide any information relating to the second conference call bridge when the individual is one of the individuals that is to be automatically added to the second conference call bridge; and
connects an individual that has called the single telephone number to at least one of the telephony device used by the administrator of the first and second conference call bridges and/or a voice mailbox when the individual is not one of the individuals that is to be automatically added to either the first conference call bridge or the second conference call bridge.

* * * * *